United States Patent [19]

Dash

[11] Patent Number: 5,090,104
[45] Date of Patent: Feb. 25, 1992

[54] METHOD OF MAKING A CORE LOCK SHAFT

[75] Inventor: Thomas E. Dash, Aurora, Ill.

[73] Assignee: Wallace Computer Services, Inc, Hillside, Ill.

[21] Appl. No.: 738,337

[22] Filed: Jul. 31, 1991

[51] Int. Cl.[5] .................... B23P 11/02; B23P 13/04
[52] U.S. Cl. ................................ 29/434; 29/893.2; 29/525.1; 29/558
[58] Field of Search ............... 29/893.1, 893.2, 434, 29/525.1, 557, 558; 242/68, 68.5, 68.2, 68.1, 68.4, 72 R; 279/2 R, 2 A

[56] References Cited
U.S. PATENT DOCUMENTS 1,122,627 12/1914 Milne .
2,798,678 7/1957 Dadd .
4,095,695 6/1978 Steidinger .
4,158,446 6/1979 Blake .
4,754,915 7/1988 Steidinger .

Primary Examiner—Timothy V. Eley
Attorney, Agent, or Firm—Tilton, Fallon, Lungmus & Chestnut

[57] ABSTRACT

A method of making a core lock shaft for supplying paper to a computer printer including the steps of cutting an actually elongated recess in the periphery of a cylindrical shaft midway of the shaft length and to a predetermined depth to provide a chordal bottom wall, grinding a plurality of axially extending transversely spaced slots in the bottom wall to provide a plurality of rack teeth, providing a length of pinion wire of a diameter slightly greater than the predetermined depth of the recess, drilling the ends of the pinion wire to provide axially extending bores and inserting a dowel pin in each bore with a portion of the dowel pin length projecting axially beyond the pinion wire ends, mounting the pinion wire in the recess with the pinion teeth in engagement with the rack teeth and installing clips at the ends of the recess in covering relation to the projecting portions of the dowel pins.

4 Claims, 2 Drawing Sheets

METHOD OF MAKING A CORE LOCK SHAFT

BACKGROUND AND SUMMARY OF INVENTION

This invention relates to a method of making a core shaft and, more particularly, to a shaft for supporting a roll of paper or the like in either an unwind or a rewind which includes a rack and pinion lock.

Such locks are old and well known—see, for example, U.S. Pat. Nos. 1,122,627; 2,798,678 and 4,158,446. However, such core lock shafts have not been used in connection with computer printers—the field to which the instant invention finds particular application.

For many years, business forms were zig-zag folded by the manufacturer and then stepped through the computer printer and refolded. With the advent of higher speed printers, particularly laser printers, this meant that boxes of folded forms had to be opened and installed every few minutes. This was acceptable for short runs but for longer runs, the art has turned to roll feed to avoid the problems of handling the folded forms.

Conventional art for clamping the core of the roll to the shaft or mandrel included end chucks which, again, required some time for installation and adjustment. Also widely employed were air bags internal of the shaft which expanded dogs or gripping segments and which were expensive and further required the access to compressed air. Although many operating plants have compressed air available, often it turned out that the only reason for using the compressed air was to have the shaft arcuate segments moved radially outward into gripping relation with the core.

The drawbacks have been avoided through the instant invention which employs an axially elongated rack and pinion provided within an opening or recess in the outer wall of the shaft. The inventive method provides a core lock shaft specifically advantageous in connection with computer printers and which costs a few hundred dollars as contrasted to the several thousand dollars involved in the more complicated equipment used currently by the art and which requires special maintenance.

According to the inventive method, a cylindrical shaft having a diameter of about 3" and a length of about 8" is adapted to rotatably support a paper roll having a diameter of up to about 50" and normal widths ranging from 8 to 22". The method includes cutting an axially elongated recess in the shaft periphery to provide a chordal bottom wall in which a plurality of axially extending transverse slots are ground to develop rack teeth. The unexpected economy is provided by using a length of pinion wire having a diameter slightly greater than the depth of the recess and equipping the pinion wire ends with inserted dowel pins. The so-equipped pinion wire is then mounted in the recess with interlacing of the pinion teeth and the rack teeth and clip means installed at the ends of the recess to retain the dowel pin-equipped pinion wire.

Other objects and advantages of the invention may be seen in the details of construction and operation set forth in the ensuing specification.

BRIEF DESCRIPTION OF DRAWING

The invention is described in conjunction with an illustrative embodiment in the accompanying drawing in which—

DETAILED DESCRIPTION

Figure 1:
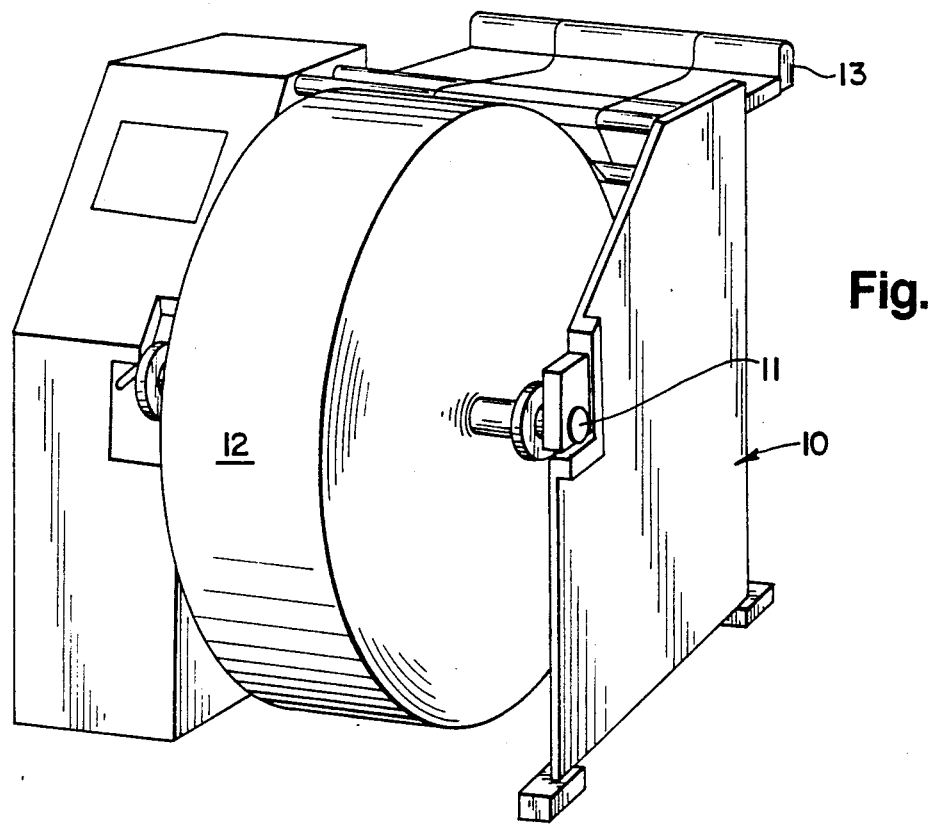
FIG. 1 is a fragmentary perspective view of a portion of the unwind and associated printer which shows a typical environment for the practice of the invention.

In the illustration given and with reference first to FIG. 1, the numeral 10 designates generally an unwind featuring side frames carrying the inventive shaft generally designated 11 and which supports a roll of paper 12. As is conventional, the paper web W is advanced by draw rolls and idlers into a computer printer 13 (shown only fragmentarily).

Figure 2:
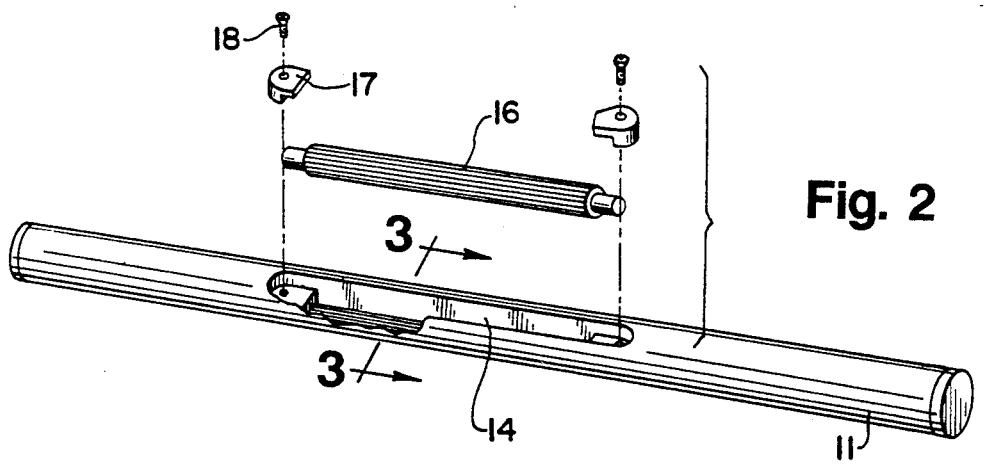
FIG. 2 is an exploded perspective view of the shaft with the inventive rack and pinion means.
Figure 3:
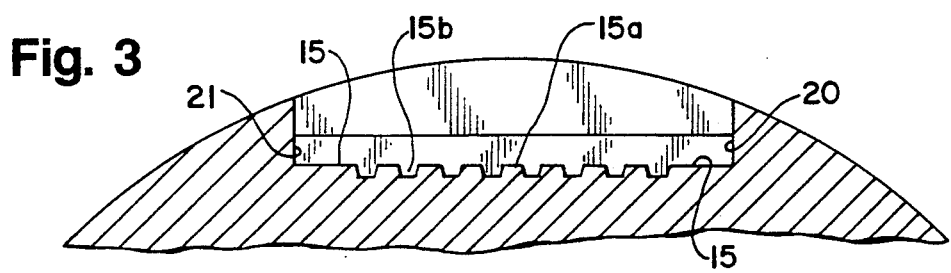
FIG. 3 is a fragmentary sectional view such as would be seen along the sight line 3—3 of FIG. 2.

The elements of the shaft 11 can be quickly appreciated from a consideration of FIG. 2. There the numeral 14 designates a generally rectangular recess (elongated axially) and which has a chordally disposed bottom wall 15 arranged to form a rack—see particularly FIG. 3.

Figure 4:
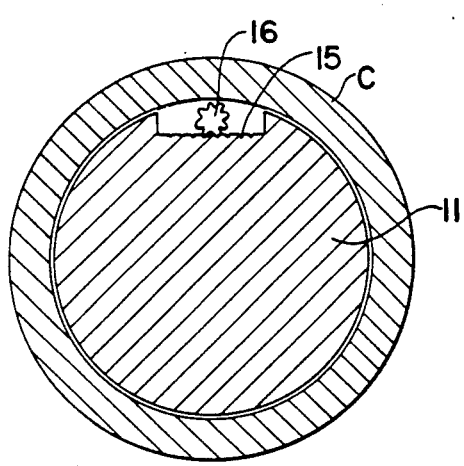
FIG. 4 is an enlarged sectional view of the assembled shaft and core showing the pinion in the position it assumes for core ensleevement.

Positioned within the opening 14 and in engagement with the rack 15 is an axially elongated pinion 16 which is movably held in engagement with the rack 15 by means of clips 17 and machine screws 18. The operation of the shaft made according to the invention can be best appreciated from a consideration of FIGS. 4 and 5.

OPERATION

Referring now to FIG. 4 the numeral 11 again designates the shaft on which is ensleeved a core C. The pinion 16 is midway of the rack 15 and therefore projects minimally above the cylindrical periphery of the shaft 11.

Figure 5:
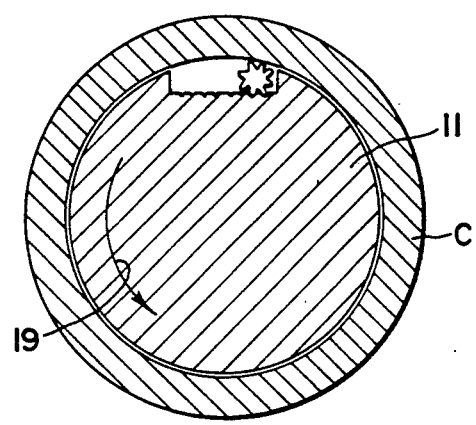
FIG. 5 is a view similar to FIG. 4 but showing the pinion moved to a core-locking position based upon relative rotation between the core and shaft.

Upon relative rotation between the core C and the shaft 11—as indicated by the arrow 19 in FIG. 5, the pinion moves transversely and, in so doing, projects above the periphery of the shaft 11 so as to be in biting or clamping engagement with the inside diameter of the core C. It will be immediately appreciated that it does not make any difference which way the relative rotation is performed because, in either event, the pinion 16 rolls toward one of a pair of sidewalls 20-21 into gripping relationship with the core. Thus, the locking of the core to the shaft is automatic and without the need of human attention.

METHOD OF MAKING

The invention is explained in conjunction with an advantageous application to a computer printer such as a laser printer. There, the normal roll has a diameter of about 50" and a width in the range of about 8-16" to provide a series of sheets which thereafter can be either converted to mailers as such or can be incorporated into stuffed, sealed envelope assemblies. Representative of a laser mailer is co-owned U.S. Pat. No. 4,754,915 and a mailer envelope assembly is shown in co-owned U.S. Pat. No. 4,095,695.

A. DEVELOPING THE SHAFT BODY

For this I provide a cylindrical shaft having a diameter of about 3" and a length of about 18" with the shaft end portions being adapted to serve as journals for rotatably supporting the paper roll. Lightness and economy are both served by using a 3" diameter steel tube having an I.D. of 2" to provide a 1" wall thickness.

An axially elongated recess 14 is cut in the shaft periphery generally midway of the shaft length. Excellent results are obtained with the recess depth being about 0.300" measured from the bottom wall 15 to the maximum point on the periphery. More particularly, this is measured from the top of the middle rack tooth 15a (see FIG. 3) to the shaft periphery. So the recess 14 has a predetermined depth to provide the chordal bottom wall 15 and longitudinally extending sidewalls 20, 21. The sidewalls 20, 21 extend generally perpendicularly to the bottom wall and are separated in the illustration given by a distance of about 1". With an 18" long shaft 11, excellent results are obtained by making the recess about 4" long generally midway of the length of the shaft, viz., the end portions of the shaft beyond the recess 14 being in the range of about 6 to about 8".

B. DEVELOPING THE RACK

For developing the rack in the bottom wall 15 which consists of a plurality of teeth like that designated 15a, I grind a plurality of axially-extending, transversely spaced slots as at 15b (see FIG. 3) to develop a plurality of rack teeth such as illustrated at 15a. In the illustration given, the rack has eight saw cuts each about 0.05" wide by about 0.020" deep. The outermost cuts 15b are spaced about 0.125 to about 0.030" in from the walls 20, 21 to provide a center-to-center distance of teeth of about 0.0100".

C. DEVELOPING THE PINION

For developing the pinion 16, I employ a length of pinion wire which has a diameter (tooth-to-tooth) of about 3.8" and is advantageously made up of 32 pitch, 10 tooth steel pinion wire.

Figure 7:
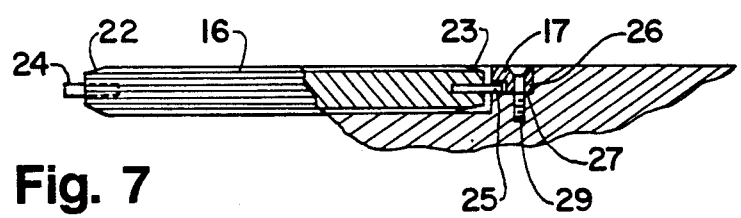
FIG. 7 is a fragmentary axial sectional view through the shaft and showing the mounting of the pinion.

In one preferred embodiment I taper or bevel the ends of the pinion 16 as at 22, 23 (see FIG. 7) for the easy engagement of the core C with the pinion 16 during ensleevement. It is advantageous to provide the bevels at an angle of about 10° relative to the axis of the pinion 16 for this purpose and with the bevels extending over about ¼" over each end of the steel wire making up the pinion 16.

To maintain the pinion in engagement with the rack and to prevent the same from moving radially outwardly, I provide stub shafts as at 24 and 25 (see FIG. 7) which lightly engage the underside of the clips 17. For this purpose, each end of the pinion 16 is drilled along the axis to provide a 1/16" diameter bore into which is inserted a 1/16" diameter by ½" long dowel pin. The depth of the bore is about ¼" so as to leave ¼" of each dowel pin to serve as the stub shaft 24 or 25.

D. DEVELOPING THE ASSEMBLY

Figure 6:
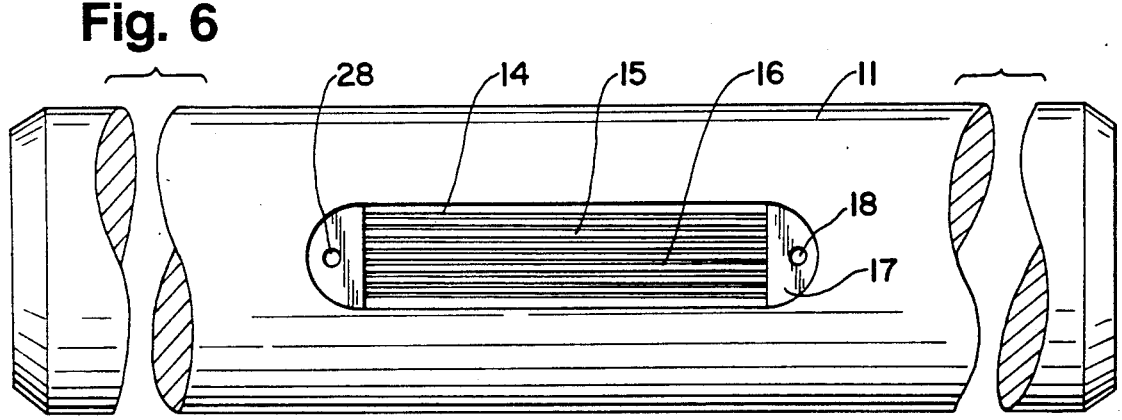
FIG. 6 is a fragmentary top plan view of the assembled rack and pinion.

For completing the assembly, the pinion 16 is mounted in the recess 14 with the pinion teeth in engagement with the rack teeth. Thereafter the clips 17 are installed and for this purpose, each recess adjacent each end wall 26 (see the right hand portion of FIG. 7) is equipped with a ledge 27 for supporting the clip 17. Each clip 17 is maintained in place by a machine screw 18 extending through a hole 28 punched into each clip 17 (see FIG. 6). Correspondingly, the ledge 27 is drilled and tapped as at 29 for the receipt of the machine screws 18. Thus, the clips 17 at the ends of the recess 14 are in covering relation to the projecting portions of the dowel pins 24, 25.

Not only is replacement facilitated by the provision of the assembly just described employing the machine screws 18, clips 17 and pinion 16 but further a lightweight and economical overall core shaft is provided. By selecting pinion wire of ⅜" nominal O.D., I able to provide suitable support without weakening the shaft tube. For example, if a larger pinion is selected, a greater depth cut is required for the recess 14 while if a smaller diameter pinion is selected, the size of the dowel pins has to be reduced correspondingly thereby raising the possibility of weakening the same.

While in the foregoing specification a detailed description of an embodiment of the invention has been set down for the purpose of illustration, many variations in the details herein given may be made by those skilled in the art without departing from the spirit and scope of the invention.

I claim:

1. A method of making a core lock shaft for supplying paper to a computer printer comprising
   providing a cylindrical shaft having a diameter of about 3" and the length of about 18" with the shaft end portions being adapted to serve as journals for rotatably supporting a paper roll having a diameter of up to about 50",
   cutting an axially elongated recess in the shaft periphery generally midway of the shaft length, said recess having a predetermined depth to provide a chordal bottom wall and longitudinally extending sidewalls, said sidewalls extending generally perpendicularly to said bottom wall,
   grinding a plurality of axially-extending, transversely spaced slots in said bottom wall to develop a plurality of rack teeth,
   providing a length of pinion wire of a diameter slightly greater than said predetermined depth, said diameter being measured between opposed teeth of said pinion wire,
   drilling the ends of said pinion wire to provide axially-extending bores and inserting a dowel pin in each said bore with a portion of the dowel pin length projecting axially beyond the pinion wire ends,
   mounting said pinion wire in said recess with said pinion teeth in engagement with said rack teeth, and
   installing clip means at the ends of said recess in covering relation to the projecting portions of said dowel pins.

2. The method of claim 1 in which said shaft providing step includes the provision of a tube having a wall thickness of the order of about 1", said predetermined depth being of the order of about 0.300" and the diameter of said pinion wire being about ⅜" and the diameter of said dowel pins being about 1/16".

3. The method of claim 1 in which prior to said pinion wire mounting step, said pinion wire is conically tapered at each end at an angle of about 10° to the axis of said shaft and over about ¼" of each end.

4. The method of claim 1 in which prior to said clip means installing step, said recess is drilled and tapped at each end to provide a bolt-receiving opening and said clip means installing step includes threadably inserting a bolt into each opening to fix a planar clip.

* * * * *